Figure 1:
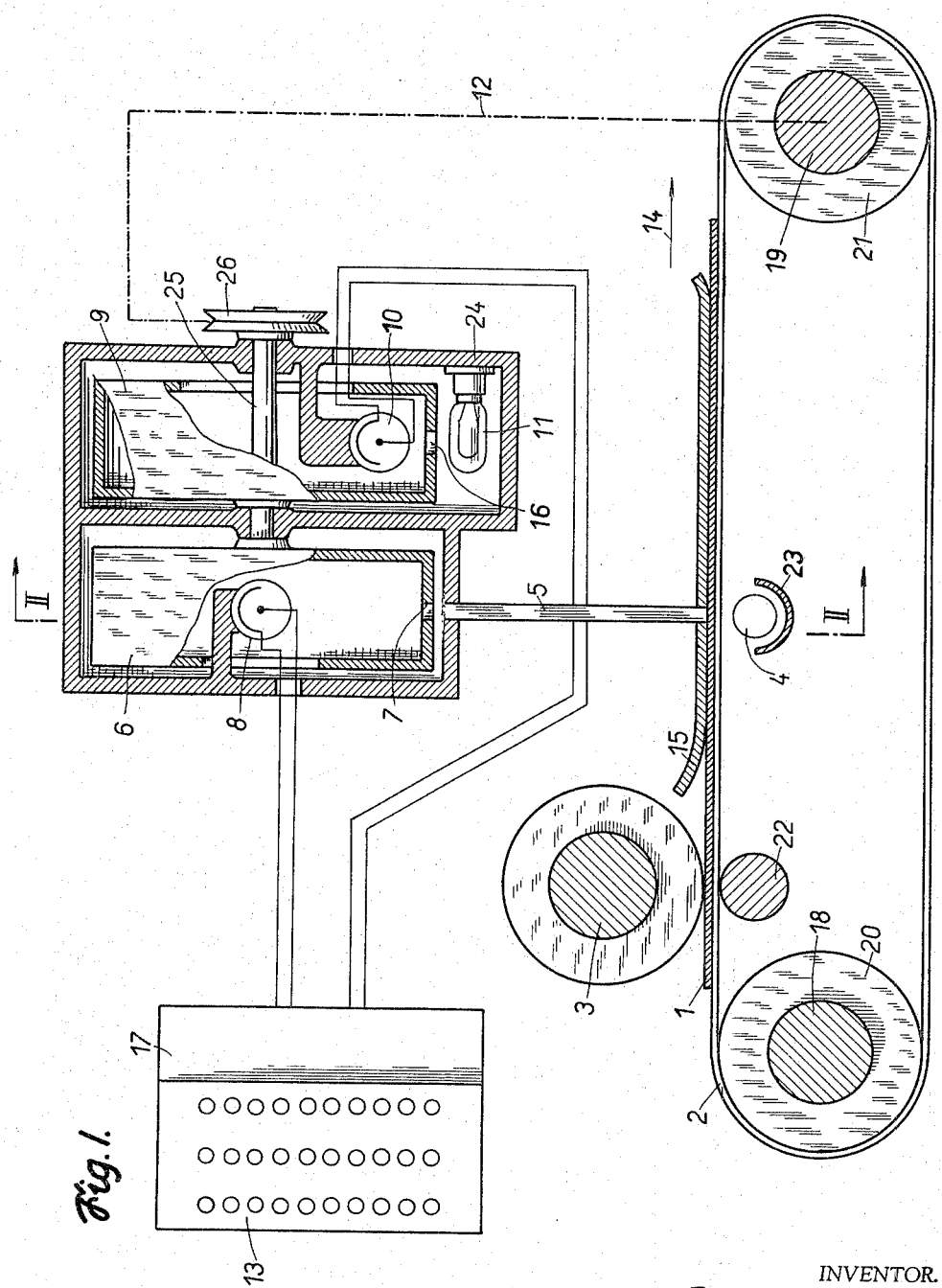

3,312,140
APPARATUS FOR MEASURING THE SURFACE AREA OF A SUBSTANTIALLY FLAT OBJECT
Jiri Dokoupil, Krnov, Czechoslovakia, assignor to Strojosvit Krnov, narodni podnik, Krnov, Czechoslovakia, a corporation of Czechoslovakia
Filed Sept. 5, 1961, Ser. No. 135,971
Claims priority, application Czechoslovakia, Sept. 6, 1960, 5,449/60
4 Claims. (Cl. 88—14)

This invention relates to the measurement of surface areas of substantially flat objects, and more specifically to an apparatus for measuring the surface area of a flat object of irregular contour.

The measurement of the area of a major surface of a flat object such as a hide, an element of a garment prior to sewing, and similar irregularly shaped flat object is of substantial economic importance. Many devices have been suggested for use in such measurements, and they employ many physical principles in order to arrive at measured values of the greatest possible precision in the shortest possible time. The requirements of high speed and precision are contradictory, and the known devices have to compromise between the two.

The primary object of this invention is the provision of apparatus for measuring the surface area of an irregularly shaped flat object with great accuracy and precision, and in a very short time.

Another object is the provision of such apparatus which is not affected by irregularities in the thickness of the object measured.

A further object is the provision of surface measuring apparatus the operation of which is independent of the ambient atmosphere.

Yet another object is the precise measurement of surface areas of objects regardless of the physical or chemical properties of the measured object.

An additional object is the provision of an apparatus capable of achieving the above-enumerated objects, yet simple and sturdy in its structure and not subject to appreciable wear or other deterioration even when operated by unskilled personnel.

With these and other objects in view, the invention contemplates the use of conveying means for moving the object to be measured along a predetermined path. A plurality of light beams extend across the path. They are emitted by a light source arranged on one side of the path so that they may be intercepted by the moving object. The several beams are laterally offset relative to each other. A photoelectric cell is arranged on the other side of the path and spaced therefrom. Elongated elements of a light conducting material such as polymethyl methacrylate are interposed between the path of the object and the photoelectric cell so as to pipe the several beams individually to the cell when they are not intercepted by the moving object. A movable shutter is interposed between the light conducting elements and the cell to scan the former and to expose the cell intermittently to the transmitted beams. The sequential pulses which are emitted by the cell are counted, and furnish an indication of the area of the measured object.

Figure 2:
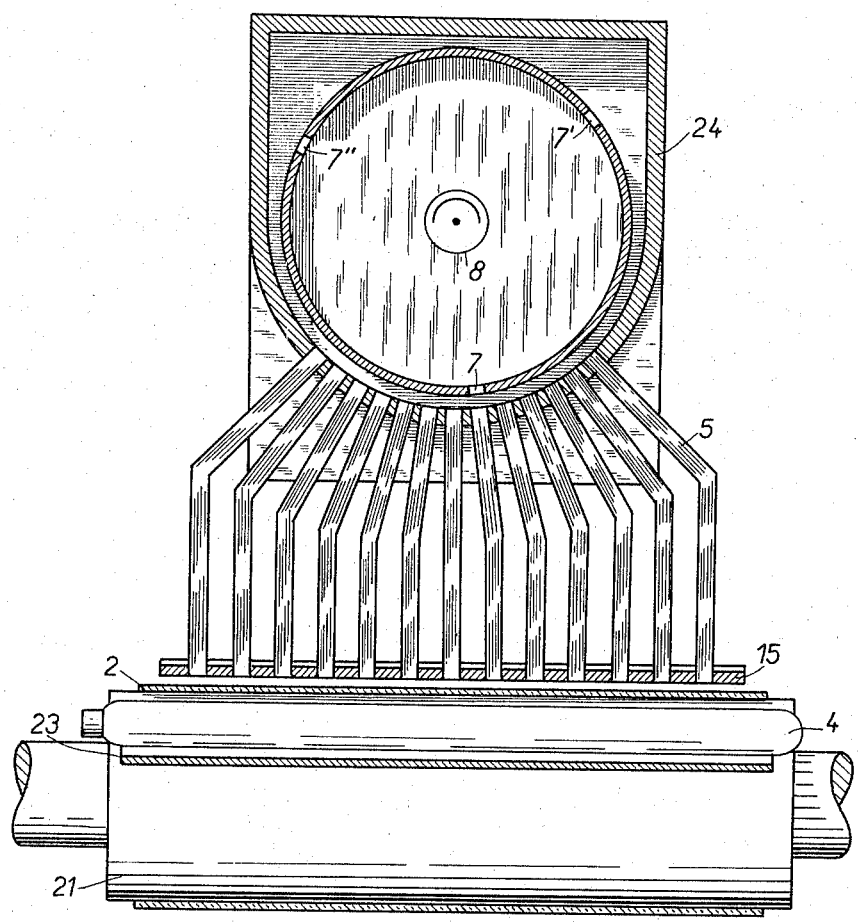

Other features and many of the attendant advantages of this invention will be readily appreciated as the same becomes better understood by reference to the following detailed description when considered in connection with the accompanying drawing wherein:

FIG. 1 is a side-elevational partly sectional view of a preferred embodiment of the invention; and FIG. 2 shows the apparatus of FIG. 1 in fragmentary front-elevational section on the line II—II.

Referring now to the drawing in detail, there is shown an endless conveyor band 2 of light permeable material trained over two cylindrical rolls 20, 21 mounted on respective horizontal shafts 19, 20. The shaft 19 is connected to a prime mover (not shown) and is driven to impart movement to the band 2. A hide 1 the surface area of which is to be measured is placed on the band 2 and travels in the direction of the arrow 14. Prior to the taking of the area measurement, the hide 1 is flattened between a driven resilient flattening roller 3 and the band 2 which is backed by a pressure roller 22 opposite the flattening roller.

Further along the band 2 in the direction of its movement there is arranged at the underside of the belt 2 a light source consisting of a tubular lamp 4 such as a conventional fluorescent tube elongated transversely of the band movement, and a reflector 23 which directs the light beams produced by the lamp 4 upwards through the light permeable conveyor band 2. A horizontal guide plate 15 is located above the band 2 for guiding the hide 1 past the light source. The guide plate is opaque.

A large number of vertical polymethyl methacrylate rods 5 are inserted in the guide plate 15 in a row aligned with the tube 4. The polished flat end faces of the rods 5 are uniformly spaced in the row opposite the lamp 4. When the hide 1 does not intercept the light beams emitted from the lamp, the beams are received by the plastic rods and piped upward into an opaque housing 24 which is a portion of the stationary frame of the apparatus which is not otherwise illustrated. The several rollers 3, 20, 21, 22 are journaled in the frame, and the light source 4, 23 and other elements of the apparatus are supported on the frame in a conventional manner not requiring further description or illustration.

As best seen from FIG. 2, the wall of the housing 24 through which the rods 5 pass is of cylindrical shape, and the rods converge towards its center. The housing encloses a rotary cylindrical drum 6 of opaque material formed with three slots 7, 7', 7", which are angularly offset about the axis of the drum by angles of 120°. When the drum rotates, the polished longitudinal end faces of the rods 5 are sequentially aligned with the slots. Since these faces define a circular arc of less than 120° about the drum axis, not more than one of the slots is aligned with a rod face at any one time.

A photoelectric cell 8 is centrally mounted in the drum 6. The rods 5 are bent in such a manner that they enter the housing 24 radially relative to the drum axis, and the cell 8 is sequentially exposed to light beams emitted by the upper end faces of the rods 5 as the rods are scanned by the slots 7, 7', 7" in the drum 6 which constitutes a shutter.

The drum 6 is mounted on a shaft 25 journaled in the housing 24 and projecting therefrom. A pulley 26 is fastened on the projecting portion of the shaft 25 and is driven by a motion transmitting train 12 energized by the same prime mover as the roll 21. The shaft 25 therefore rotates in synchronization with the movement of the conveyor band 2 and of the hide 1 in the direction of the arrow 14. The motion transmitting train 12 may consist simply of a belt also engaging a pulley on the shaft 19. If a belt drive is employed, the belt is preferably of the type commonly referred to as a timing belt which does not permit slippage between the belt and the driving and driven pulleys. Gear transmissions, or chain and sprocket transmissions may obviously be resorted to to ensure synchronization between the movements of the hide 1 and the shutter drum 6.

The shaft 25 also carries a second drum 9 generally similar to the drum 6 and similarly serving as a shutter. The drum 9 is mounted adjacent a light bulb 11 in a compartment of the housing 24 optically insulated from the photoelectric cell 8. A second photoelectric cell 10 is fixedly arranged inside the drum 9 and is adapted to receive light from the bulb 11 when aligned with a slot 16 in the drum 9. While only a single slot 16 is visible in FIG. 1, it will be understood that the number of slots 16 in the drum 9 is equal to the product of the number of the rods 5 times the number of the slots 7, 7', 7". In other words, when light is transmitted by all rods 5 from the lamp 4 to the photoelectric cell 8, the cell 8 is exposed as often during each revolution of the shaft 25 as the cell 10. The angular distribution of the slots 16 about the shaft 25 is such that the exposures of the photocells 8 and 10 coincide, and signals are emitted simultaneously by both cells in the absence of the hide 1.

The signals of the two photoelectric cells are fed to a differential counter 17 of conventional design equipped with a three-digit decade indicator board 13. The counter does not respond to simultaneously received signal pulses from both photoelectric cells, but is advanced one unit whenever a pulse signal is received from the cell 10 without a simultaneous balancing signal from the photoelectric cell 8.

The afore-described apparatus operates as follows:

As the hide 1 progresses on the band 2 in the direction of the arrow 14, it blocks light beams which would otherwise pass from the fluorescent bulb 4 through some of the rods 5 toward the photoelectric cell 8. Simultaneously, the shutter drum 6 scans the light emitting end faces of the rods once during each third of one revolution of the shaft 25.

Each position of alignment of the slots 7, 7', 7" with the end face of one of the rods 5 corresponds to a point scanned on the hide 1 or on the light permeable conveyor band 2 not covered by the band. These points are arranged in slightly oblique rows transverse of the direction of the arrow 14. The spacing of the rows in the direction of movement depends on the transmission ratio of the motion transmitting train 12, and may be chosen very close without any difficulty, and without unduly reducing the speed of the conveyor band 2. The transverse spacing of the points in each row is a function of the number of rods 5 which are aligned transversely across the width of the hide 1.

While, FIG. 2 illustrates thirteen rods 5 of relatively great thickness relatively widely spaced from each other for the sake of clarity, it will readily be understood, that the rods may actually not be thicker than fibers, and may be arranged as closely as desired without interfering with the light conducting or piping effect characteristic of the optical grades of acrylic resins, and generally of materials the index of refraction of which differs substantially from that of the ambient air. While a single row of rods 5 has been illustrated for simplicity's sake, several axially spaced rows scanned by respective apertures in the shutter drum 6 will permit an even greater number of light conducting elements to be crowded into a given width of the conveyor band 2, thus increasing the number of points scanned on the hide 1, the number of signals emitted for a given length of the hide 1 by the cell 8, and correspondingly by the cell 10 because of the corresponding number of slots 16 in the drum 9.

Regardless of the absolute speed of movement of the shafts 19 and 25, their synchronization will produce a uniform number of scanned points on the conveyor band 2 or on the hide 1 over any given surface area of either. Actually, the projected area of the hide 1 is measured on this device, but for a flat object such as a hide, this area is substantially identical with the surface area of one of the two major surfaces which are separated by the minor dimension of the flat object, namely the thickness.

The indicator board 13 displays the number of timing pulses received from the photoelectric cell 10 without a simultaneous balancing pulse from the cell 8. With the conveyor empty, both cells emit simultaneous signals, and the counter does not advance. Passage of the hide 1 through the apparatus produces as many counting units as there are scanned points on the projected surface of the hide. Since these points are uniformly distributed over the surface, the number of points is directly proportional to the surface area which it is desired to measure. It is obvious that the counter indicator 13 may be made directly to read in square inches or any other desired unit of area measurement by suitably choosing the transmission ratio of the train 12 and the number of positions of alignment of the slots 7, 7', 7" during each revolution of the shaft 25 on an apparatus of the invention of otherwise fixed dimensions and operating characteristics.

As has been mentioned above, it is not necessary to provide a drive of uniform speed for the shaft 19 as long as a fixed ratio of speeds between the shafts 19 and 25 is maintained. Obviously, arrangements can readily be contrived in which this ratio is varied in a fixed manner and the variation compensated for in other mechanical or electrical elements of the apparatus.

Other modifications and variations of the apparatus of the invention will suggest themselves to those skilled in the art without the exercise of inventive faculty. The cells 8 and 10 may be of the type which generates electric voltage responsive to irradiation with light, but cells which respond to light by varying their resistance to electric current are fully operative in the apparatus illustrated and described, and the term "photoelectric cell" will be understood to cover such cells of variable resistance, and other photoelectric devices from which a signal can be derived responsive to exposure to light. The counter 17 will be understood to include the power sources or other auxiliary devices required to energize the cells, and amplifiers and other circuitry that may be judged convenient to modify the output of the cells in a manner well known to those skilled in this art.

It will be understood, therefore, that the foregoing disclosure relates to only a preferred embodiment of the invention, and that numerous modifications or alterations may be made therein without departing from the spirit and the scope of the invention as set forth in the appended claims.

What I claim is:

1. In an apparatus for measuring the area of a major surface of a substantially flat object having two major dimensions and a minor dimension, said dimensions being at right angles to each other, in combination, conveying means for moving said object in a predetermined path in the direction of one of said major dimensions; a source of a plurality of light beams on one side of said path, said beams extending in the direction of said minor dimension, being spaced from each other in the direction of the other one of said major dimensions, and arranged for selective interception by said object when the same is moved by said conveying means; a plurality of elongated light-conducting elements on the other side of said path, said elements having respective light-receiving longitudinal end faces adjacent said object when the same is moved by said conveying means, said end faces being spaced from each other and aligned with respective beams in the direction of said minor dimension for receiving the aligned beams when the same are not intercepted by said object, and respective light-emitting faces spaced from the corresponding light-receiving faces in a direction away from said light source, said elements converging in a direction from said light-receiving to said light-emitting faces thereof, said light-emitting faces being closely juxtaposed and defining an arc; photo-electric cell means centered in said arc opposite said light-emitting faces; a rotary shutter interposed between said arc and said cell means for sequentially exposing the latter to light emitted from said elements; and counter means in circuit with said cell means for counting exposure signals emitted by said cell means responsive to sequential exposure to said emitted light.

2. In an apparatus as set forth in claim 1, said light conducting elements being of a transparent material having an index of refraction substantially different from the index of refraction of air.

3. In an apparatus as set forth in claim 1, control means for synchronizing the movement of said object and the rotation of said shutter.

4. In an apparatus as set forth in claim 3, said shutter having an aperture therein sequentially alignable with said light-emitting end faces for exposing said cell means; and said counter means including signal generating means for generating a time signal synchronized with each alignment of said aperture with each of said light-emitting end faces, and indicia means responsive to said time signals and said exposure signals for indicating the number of time signals received without simultaneous reception of an exposure signal, whereby said indicated number is representative of the area of said major surface.

References Cited by the Examiner

UNITED STATES PATENTS

| 3,002,283 | 10/1961 | Quinn et al. | 88—1 |
| 3,036,153 | 5/1962 | Day | 88—1 |

FOREIGN PATENTS

| 1,035,812 | 4/1953 | France. |
| 601,843 | 8/1934 | Germany. |
| 632,955 | 7/1936 | Germany. |
| 715,631 | 9/1954 | Great Britain. |

JEWELL H. PEDERSEN, *Primary Examiner.*

R. L. WIBERT, *Assistant Examiner.*